(12) United States Patent
Johnson et al.

(10) Patent No.: US 10,293,798 B2
(45) Date of Patent: May 21, 2019

(54) BRAKING SYSTEM WITH SELECTIVE BRAKING BACKUP SYSTEM

(71) Applicant: FORD GLOBAL TECHNOLOGIES, LLC, Dearborn, MI (US)

(72) Inventors: Brad J. Johnson, Ann Arbor, MI (US); Chad M. Korte, Grosse Ile, MI (US); Dale S. Crombez, Livonia, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/223,472

(22) Filed: Mar. 24, 2014

(65) Prior Publication Data
US 2015/0266457 A1   Sep. 24, 2015

(51) Int. Cl.
| | | |
|---|---|---|
| *B60T 13/74* | (2006.01) | |
| *B60T 8/1766* | (2006.01) | |
| *B60T 7/04* | (2006.01) | |
| *B60T 13/66* | (2006.01) | |
| *B60T 13/68* | (2006.01) | |

(52) U.S. Cl.
CPC ............ *B60T 8/1766* (2013.01); *B60T 7/042* (2013.01); *B60T 13/662* (2013.01); *B60T 13/686* (2013.01); *B60T 2220/04* (2013.01); *B60T 2270/402* (2013.01)

(58) Field of Classification Search
CPC ............................ B60T 7/042; B60T 2270/402
See application file for complete search history.

(56) References Cited

U.S. PATENT DOCUMENTS

| | | | |
|---|---|---|---|
| 4,057,296 A | 11/1977 | Oka et al. | |
| 4,586,591 A | 5/1986 | Belart | |
| 4,629,043 A | 12/1986 | Kouji et al. | |
| 5,139,315 A * | 8/1992 | Walenty et al. | ............... 303/162 |

(Continued)

FOREIGN PATENT DOCUMENTS

| | | |
|---|---|---|
| CN | 104309597 A | 1/2015 |
| JP | 016124409 A | 7/2016 |

(Continued)

OTHER PUBLICATIONS

Non-Final Office Action in U.S. Appl. No. 15/223,637, dated May 2, 2018.

*Primary Examiner* — Bradley T King
(74) *Attorney, Agent, or Firm* — Jones Robb, PLLC; Raymond Coppiellie

(57) ABSTRACT

A brake system for a vehicle may include a primary braking system, a backup braking system, and a braking system controller. The primary braking system may apply braking energy to wheels of the vehicle. The backup braking system may include a master cylinder configured to supply braking energy to one or more of the wheels of the vehicle. The braking system controller may be configured to select a mode of backup braking based on a functional state of the primary braking system. The braking system controller may control the master cylinder to supply braking energy to less than all of the wheels of the vehicle in a first mode of backup braking and supply the braking energy to all of the wheels of the vehicle in a second mode of backup braking. A parking brake may assist the backup braking system by utilizing proportional braking in a backup braking mode.

13 Claims, 7 Drawing Sheets

(56) References Cited

U.S. PATENT DOCUMENTS

| | | | |
|---|---|---|---|
| 6,354,672 B1 * | 3/2002 | Nakamura | B60T 8/367 188/358 |
| 6,406,102 B1 * | 6/2002 | Arnold | 303/20 |
| 6,450,591 B1 * | 9/2002 | Kawahata et al. | 303/122.05 |
| 6,476,515 B1 * | 11/2002 | Yamamoto et al. | 307/10.1 |
| 6,582,030 B2 | 6/2003 | Harris | |
| 6,598,943 B2 | 7/2003 | Harris | |
| 6,817,681 B2 * | 11/2004 | Fey et al. | 303/113.4 |
| 8,807,668 B2 | 8/2014 | Koshimizu et al. | |
| 8,924,105 B1 | 12/2014 | Miesterfeld et al. | |
| 2002/0109403 A1 * | 8/2002 | Yamamoto et al. | 303/146 |
| 2004/0075337 A1 * | 4/2004 | Giers et al. | 303/20 |
| 2004/0100146 A1 * | 5/2004 | Giers et al. | 303/122 |
| 2004/0140710 A1 | 7/2004 | Alvarez et al. | |
| 2005/0168064 A1 * | 8/2005 | McCann | 303/122.15 |
| 2006/0113158 A1 | 6/2006 | Popp et al. | |
| 2008/0106142 A1 * | 5/2008 | Nishino et al. | 303/10 |
| 2010/0105520 A1 | 4/2010 | Ohbayashi et al. | |
| 2011/0005874 A1 * | 1/2011 | Beier et al. | 188/106 F |
| 2013/0147259 A1 * | 6/2013 | Linkenbach et al. | 303/14 |
| 2014/0015310 A1 | 1/2014 | Hanzawa et al. | |
| 2015/0266457 A1 | 9/2015 | Johnson et al. | |
| 2017/0166173 A1 | 6/2017 | Lauffer et al. | |

FOREIGN PATENT DOCUMENTS

| | | |
|---|---|---|
| WO | 0234562 A1 | 5/2002 |
| WO | WO 2004/000618 A1 | 12/2003 |
| WO | WO 2011/039558 A1 | 4/2011 |

* cited by examiner

BRAKING SYSTEM WITH SELECTIVE BRAKING BACKUP SYSTEM

TECHNICAL FIELD

Aspects of the present disclosure relate to braking systems with a selective braking backup system, as well as vehicles including a braking system with a selective braking backup system and methods of braking a vehicle with a selective backup braking system.

BACKGROUND

By-wire braking systems for a vehicle may include a backup braking system, typically a push-through device that mechanically delivers hydraulic fluid to brakes of a vehicle in the event of failure of a primary braking system that provides the hydraulic fluid to the brakes when the primary by-wire braking system is operational. It may be desirable to provide additional sources of braking energy for a backup braking system in the event of failure of the primary braking system. Furthermore, it may be desirable to provide additional sources of braking energy for a backup braking system without substantially increasing the complexity or cost of manufacture of a braking system.

SUMMARY

Exemplary embodiments of the present disclosure may solve one or more of the above-mentioned problems and/or may demonstrate one or more of the above-mentioned desirable features. Other features and/or advantages may become apparent from the description that follows.

In accordance with at least one exemplary embodiment, a brake system for a vehicle may comprise a primary braking system, a backup braking system, and a braking system controller. The primary braking system may be configured to apply braking energy to wheels of the vehicle. The backup braking system may comprise a master cylinder. The master cylinder may be configured to supply braking energy to one or more of the wheels of the vehicle. The braking system controller may be configured to select a mode of backup braking based on a functional state of the primary braking system. The braking system controller may control the master cylinder to supply the braking energy to less than all of the wheels of the vehicle in a first mode of backup braking. The master cylinder may supply the braking energy to all of the wheels of the vehicle in a second mode of backup braking.

In accordance with another exemplary embodiment, a vehicle may comprise a plurality of wheels and a brake system. The brake system may comprise a primary braking system, a backup braking system, and a braking system controller. The primary braking system may be configured to apply braking energy to the wheels. The backup braking system may comprise a master cylinder configured to supply braking energy to one or more of the wheels. The braking system controller may be configured to select a mode of backup braking based on a functional state of the primary braking system. The braking system controller may control the master cylinder to supply the braking energy to less than all of the wheels in a first mode of backup braking and the master cylinder supplies the braking energy to all of the wheels in a second mode of backup braking.

In accordance with another exemplary embodiment, a brake system for a vehicle may comprise a primary braking system, a backup braking system, and a parking brake system. The primary braking system may be configured to apply braking energy to wheels of the vehicle based on an amount of brake pedal depression. The backup braking system may comprise a master cylinder configured to supply braking energy to one or more of the wheels of the vehicle. The parking brake system may be configured to supply braking energy to one or more wheels of the vehicle in a backup braking mode to assist the backup braking system. The parking brake system may utilize proportional braking in the backup braking mode in proportion to the amount of brake pedal depression.

In accordance with another exemplary embodiment, a method of braking a vehicle may comprise determining an operational state of a primary braking system of the vehicle. The method may further comprise selecting a first mode of backup braking when the primary braking system is non-functional or selecting a second mode of backup braking when the primary braking system is partially functional. When the first mode of backup braking has been selected, the method may further comprise commanding a backup braking system to supply braking energy to all wheels of the vehicle. When the second mode of backup braking has been selected, the method may further comprise commanding the backup braking system to supply braking energy to less than all of the wheels of the vehicle.

Additional objects, features, and/or advantages will be set forth in part in the description which follows, and in part will be obvious from the description, or may be learned by practice of the present disclosure and/or claims. At least some of these objects and advantages may be realized and attained by the elements and combinations particularly pointed out in the appended claims.

It is to be understood that both the foregoing general description and the following detailed description are exemplary and explanatory only and are not restrictive of the claims; rather the claims should be entitled to their full breadth of scope, including equivalents.

BRIEF DESCRIPTION OF THE DRAWINGS

The present disclosure can be understood from the following detailed description, either alone or together with the accompanying drawings. The drawings are included to provide a further understanding of the present disclosure, and are incorporated in and constitute a part of this specification. The drawings illustrate one or more exemplary embodiments of the present disclosure and together with the description serve to explain certain principles and operation.

DETAILED DESCRIPTION

The present disclosure contemplates various exemplary embodiments of braking systems for a vehicle. In accordance with the present disclosure, an overall braking system of a vehicle may include a primary braking system and a backup braking system may be configured to select a backup braking mode based on a functional state of the primary braking system. The backup braking system may select a first mode of braking when the primary braking system is partially functional and may elect a second mode of braking when the primary braking system is non-functional. In the first mode of braking, the backup braking system may supply braking energy to less than all wheels of a vehicle. In the second mode of braking, the backup braking system may supply braking energy to all wheels of a vehicle. The primary braking system may be, for example, a by-wire braking system. The overall braking system of a vehicle may further include a parking brake that may be used to provide additional braking energy to the backup braking system. The parking brake may be an electric parking brake. When the backup braking system selects the first mode of braking, the backup braking system may provide braking energy to wheels of a single axle of a vehicle and the parking brake may provide braking energy to wheels of a single axle differing from the single axle the backup braking system provides braking energy to.

Figure 1:
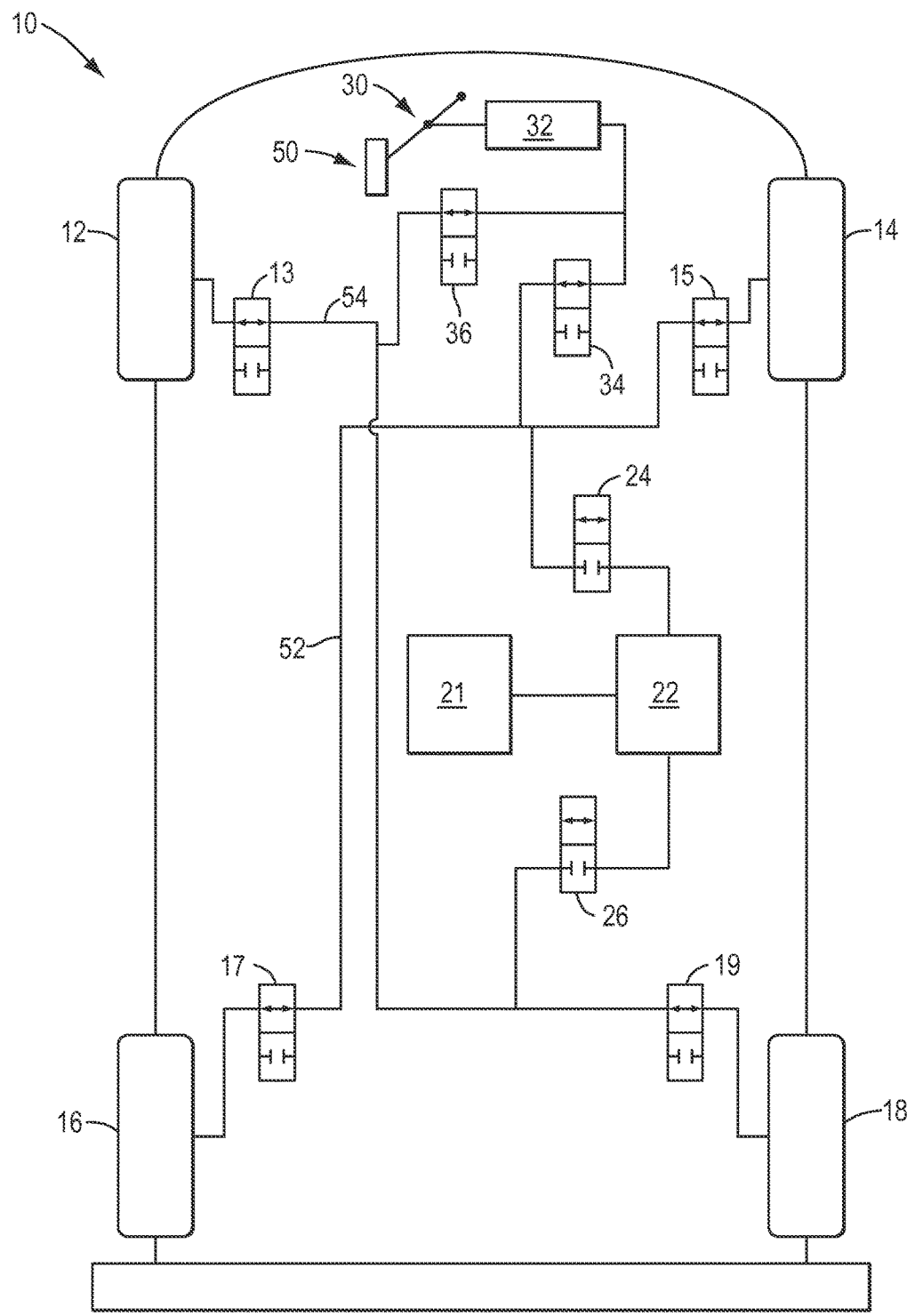
FIG. 1 is a schematic bottom view of a vehicle, according to an exemplary embodiment.

Turning to FIG. 1, a schematic bottom view of an exemplary embodiment of a vehicle 10 is shown, which includes a left-front wheel 12, a right-front wheel 14, a left-rear wheel 16, and a right-rear wheel 18. As depicted in the exemplary embodiment of FIG. 1, vehicle 10 may be an automobile, such as, for example, a passenger car. However, the various exemplary embodiments described herein may be used in other types of automobiles and other types of vehicles familiar to one skilled in the art, such as, for example, work vehicles, construction vehicles, and other vehicles one skilled in the art is familiar with.

Vehicle 10 may include a primary braking system 20 to slow and/or stop rotation of wheels 12, 14, 16, 18. According to an exemplary embodiment, primary braking system 20 may be a by-wire braking system that communicates with electronically controlled valves to supply hydraulic fluid to braking devices associated with wheels 12, 14, 16, 18. For example, primary braking system 20 may include a braking controller 21 and a pressure source 22 in communication with wheel inlet valves 13, 15, 17, 19 respectively configured to supply hydraulic fluid to braking devices (not shown) of wheels 12, 14, 16, 18. Pressure source 22 may be, for example, a pressure reservoir, a piston-cylinder, a pump, or other device familiar to one of ordinary skill in the art for providing pressure for a braking system.

According to an exemplary embodiment, primary braking system 20 may include valves in communication with brake lines in communication with wheel inlet valves 13, 15, 17, 19. For example, primary braking system 20 may include a first primary pressure supply valve 24 in communication with a first brake line 52 communicating with wheel inlet valve 15 for right-front wheel 14 and wheel inlet valve 17 for left-rear wheel 16 and a second primary pressure supply valve 26 in communication with a second brake line 54 communicating with wheel inlet valve 13 for left-front wheel 12 and wheel inlet valve 19 for right-rear wheel 18, such as when brake lines 52, 54 have a diagonal-split configuration, as shown in the exemplary embodiment of FIG. 1. However, brake lines 52, 54 are not limited to a diagonal-split configuration and may have other configurations, such as, for example, a front-rear split (one brake line is in communication with the front wheels and the other in communication with the rear wheels) or other configurations one skilled in the art is familiar with.

Vehicle 10 may further include a backup braking system 30 to slow and/or stop rotation of wheels 12, 14, 16, 18 in the event primary braking system 20 is not functional. According to an exemplary embodiment, backup braking system 30 may be a mechanical push-through system that includes a mechanical master cylinder 32 in communication with wheel inlet valves 13, 15, 17, 19 to supply hydraulic fluid to the braking devices (not shown) of wheels 12, 14, 16, 18. Backup braking system 30 may include a first master cylinder valve 34 in communication with brake line 52 communicating with wheel inlet valve 15 of right-front wheel 14 and wheel inlet valve 17 of left-rear wheel 16 and a second master cylinder valve 36 in communication with brake line 54 communicating with wheel inlet valve 13 of left-front wheel 12 and wheel inlet valve 19 of right-front wheel 18, such as when brake lines 52, 54 have a diagonal-split configuration, as shown in the exemplary embodiment of FIG. 1, although brake lines 52, 54 may have other configurations, as described above. The configuration of brake lines, such as in a diagonal-split or a front-rear split, may be selected, for example, based upon the vehicle class using the braking system and other factors, such as factors related to the suspension configuration of the vehicle one skilled in the art would be familiar with.

Braking devices (not shown) of each wheel 12, 14, 16, 18 may include, for example, a brake caliper with a piston that engages a brake pad against a rotor of a wheel, according to an exemplary embodiment. Braking systems 20, 30 may include other components not shown in FIG. 1, which may have been omitted for clarity. For example, braking systems 20 and/or 30 may include other components one skilled in the art would be familiar with, such as, for example, pumps, pressure reservoirs, hydraulic pistons, brake outlet valves, and fluid returns.

When primary braking system 20 is not functional, backup braking device 30 may be configured to supply hydraulic fluid to wheel inlet valves 13, 15, 17, 19 of wheels 12, 14, 16, 18, such as by mechanically supplying hydraulic fluid from master cylinder 32 when a brake pedal 50 connected to master cylinder 32 is depressed by a driver. In the exemplary embodiment of FIG. 1, primary pressure supply valves 24, 26 of primary braking system 20 are in a closed state to represent a non-functional state of primary braking system 20, while master cylinder valves 34, 36 of backup braking system 30 are open, permitting master cylinder 32 to supply hydraulic fluid to wheel inlet valves 13, 15, 17, 19.

The braking effectiveness of a mechanical push-through system, such as backup braking system 30, is a function of the total hydraulic and mechanical amplification of the braking system. Further, a mechanical push-through system involves an inherent compromise between pedal travel and pedal force. For example, reducing the amount of force to depress a brake pedal means lengthening the length of travel of the brake pedal when the brake pedal is depressed, and vice-versa. To address these considerations, additional braking energy may be provided to a backup braking system. However, it may be desirable to provide additional braking energy to a backup braking system without adding significant cost and/or complexity to the overall braking system of a vehicle.

Figure 2:
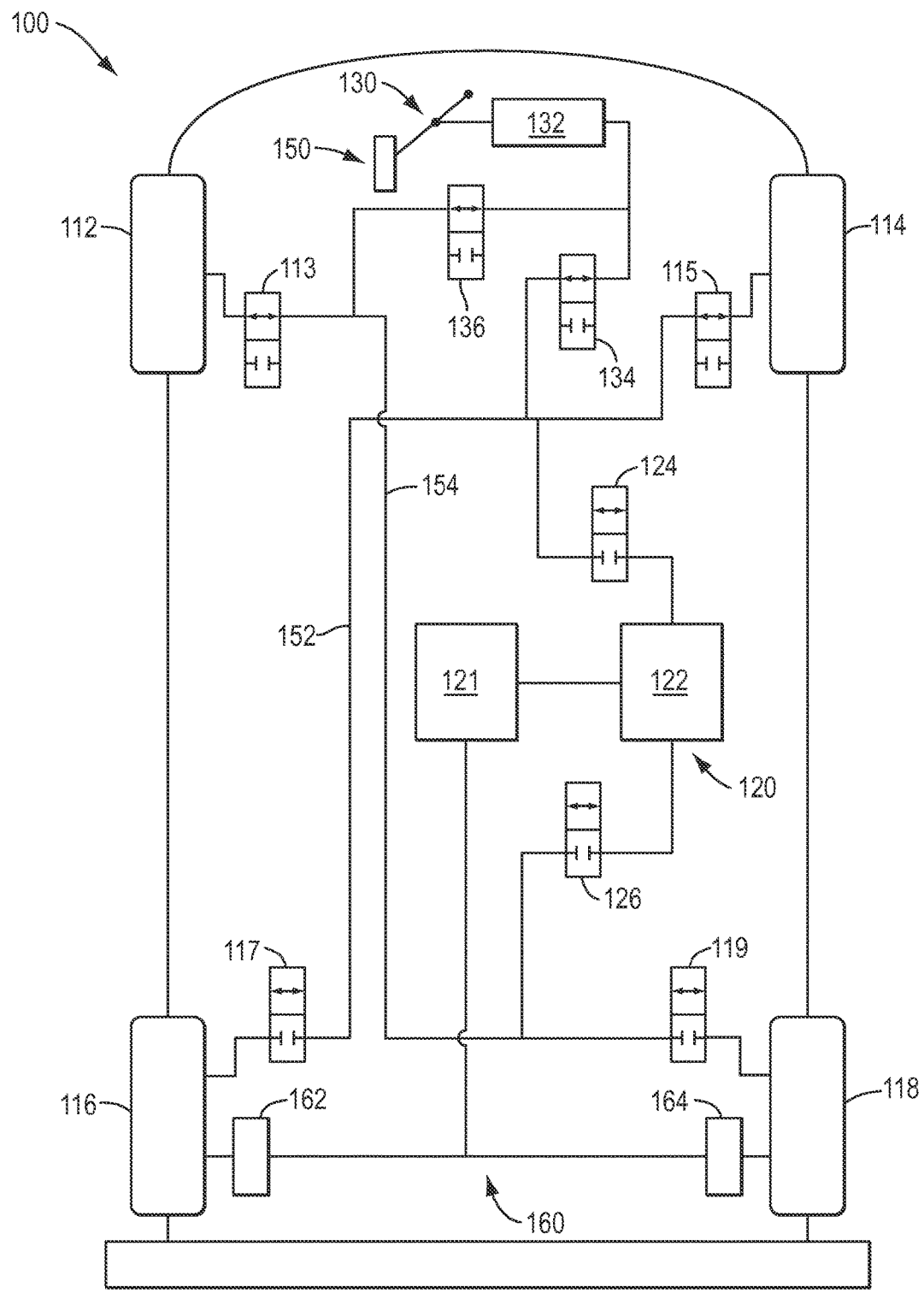
FIG. 2 is a schematic bottom view of a vehicle having a diagonal split brake line configuration when a primary braking system is partially functional, according to an exemplary embodiment.

One way to provide additional braking energy to a backup braking system is to use a parking brake of a vehicle as part of the backup braking system. Turning to FIG. 2, an exemplary embodiment of a vehicle 100 is shown that includes a left-front wheel 112, a right-front wheel 114, a left-rear wheel 116, and a right-rear wheel 118, with wheel inlet valves 113, 115, 117, 119 controlling the supply of hydraulic fluid to braking devices (not shown) of wheels 112, 114, 116, 118. Vehicle 100 further includes a braking system that includes a primary braking system 120, such as, for example, a by-wire braking system. As discussed in regard to the exemplary embodiment of FIG. 1, primary braking system 120 may include a braking controller 121 in communication with wheel inlet valves 113, 115, 117, 119 respectively configured to supply hydraulic fluid to braking devices (not shown) of wheels 112, 114, 116, 118. For instance, braking controller 121 may be in communication with a first primary pressure supply valve 124 communicating with a first brake line 152 in communication with wheel inlet valves 115, 117 of wheels 114, 116 and a second primary pressure supply valve 126 in communication with a second brake line 154 communicating with wheel inlet valves 113, 119 of wheels 112, 118. Thus, the braking system of the exemplary embodiment of FIG. 2 may have a diagonal split configuration, with each of brake lines 152 and 154 connecting one front wheel and one rear wheel diagonally across vehicle 100 from the front wheel.

The braking system of vehicle 100 further includes a backup braking system 130 including a master cylinder 132 connected to a brake pedal 150 and master cylinder valves 134 and 136 respectively connected to brake lines 152 and 154. In the configuration depicted in the exemplary embodiment of FIG. 2, primary braking system 120 is in a partially functional state. For example, pressure source 122 of primary braking system 120 may have failed, although other failure modes are possible to place primary braking system 120 in a partially functional state, such as, for example, failure of either or both of primary pressure supply valves 124, 126 (e.g., with failure resulting in the valve being in a default closed state).

According to an exemplary embodiment, controller 121 may detect the failure of pressure source 122 and close primary pressure supply valves 124 and 126 because valves 124 and 126 are no longer receiving fluid pressure from pressure source 121. When primary braking system 120 is in a partially functional state, master cylinder valves 134 and 136 may be opened to connect master cylinder 132 to brake lines 152 and 154 to supply brake fluid pressure. According to an exemplary embodiment, controller 121 may have control over the remaining brake valves in vehicle 100 besides primary pressure supply valves 124 and 126, including wheel inlet valves 113, 115, 117, 119 and master cylinder valves 134 and 136. Thus, controller 121 may detect the failure of pressure source 122, close primary pressure supply valves 124 and 126 (such as to prevent brake fluid from flowing into the failed pressure source 122), and open master cylinder valves 134 and 136 to permit fluid pressure from master cylinder 132 of backup braking system 130 to be supplied to brake lines 152 and 154. For instance, backup braking system 130 may include a first master cylinder valve 134 in communication with master cylinder 132 and first brake line 152, and a second master cylinder valve 136 in communication with master cylinder 132 and second brake line 154, but with valves 117 and 119 in a closed state for rear wheels 116 and 118. Thus, in the exemplary embodiment of FIG. 2, primary braking system 120 is partially functional and still able to activate valves 117 and 119 to close of rear wheels 116 and 118, and master cylinder 132 is providing hydraulic fluid pressure to the braking devices of front wheels 112 and 114 via valves 113 and 115.

To provide additional braking energy to backup braking system 130, a parking brake system 160 of vehicle 100 may be used to brake one or more wheels of vehicle 100. Parking brake system 160 may be, for example, an electric parking brake, according to an exemplary embodiment. As shown in the exemplary embodiment of FIG. 2, parking brake system 160 may communicate with parking brake devices 162 and 164 of rear wheels 116 and 118 that apply braking energy to rear wheels 116 and 118 to slow and/or stop rotation of rear wheels 116 and 118. As a result, parking brake system 160 may be used to provide additional braking energy to a backup brake system 130 without incurring significant additional cost or complexity to the braking system of vehicle 100 because vehicle 100 already includes parking brake 160.

According to an exemplary embodiment, when parking brake system 160 is used to provide additional braking energy, as in the exemplary embodiment of FIG. 2, controller 121 may close wheel inlet valves 117 and 119 for rear wheels 116 and 118 so that brake fluid pressure from master cylinder 132 is isolated to braking devices of front wheels 112 and 114, while parking brake system 160 is used to slow and/or stop rear wheels 116 and 118. In other words, the hydraulic pressure from master cylinder 132 may be directed to only the wheels of a single axle, such as, for example, a front axle, while a parking brake applies braking energy to the wheels of another single axle, such as, for example a rear axle. Thus, the backup braking system 130 may provide more effective braking (e.g., by being isolated to wheels of a single axle) and provide a driver with a more confident feeling regarding braking. In addition, by isolating hydraulic pressure of master cylinder 132 to one axle, total fluid consumption and travel distance of brake pedal 150 are reduced, which provide a driver with a more confident feel when braking vehicle 100. The absence of hydraulic pressure applied to rear wheels 116 and 118 may also allow parking brake 160 to operate with a higher amount of torque because the risk of vehicle instability may be minimized by using a wheel-slip control system.

According to an exemplary embodiment, parking brake system 160 may be controlled by controller 121, although parking brake system 160 may be instead controlled by a separate controller in communication with controller 121. Further, parking brake devices 162 and 164 may be, for example, brake devices actuated by electric motors. For instance, parking brake devices 162 and 164 may be screw devices to apply pressure to brake calipers of vehicle wheels, with the screw devices being actuated by electric motors driven by an electric current controlled by controller 121.

Although the exemplary embodiment of FIG. 2 depicts backup braking system 130 being configured to apply braking energy to front wheels 112 and 114 via master cylinder 132 and rear wheels 116 and 118 via parking brake system 160, the backup braking system 130 is not limited to this configuration. For example, parking brake system 160 may provide braking energy to front wheels 112 and 114 and backup braking system 130 may apply braking energy to rear wheels 116 and 118 via master cylinder 132.

As described above, a backup braking system of a vehicle may be used to slow and/or stop rotation of the wheels of the vehicle when a primary braking system becomes either fully or partially non-functional. A primary braking system may become fully non-functional (e.g., the controller of the primary braking system has failed) or only partially functional (e.g., the controller of the primary braking system is functional but one or more components of the primary braking system, such as a pressure source or one or more valves, has failed). In view of this, a backup braking system may be configured to selectively operate in different modes according to the functional state of the primary braking system so that backup braking may be efficiently conducted.

In accordance with an exemplary embodiment of the present teachings, a controller of a braking system of vehicle may be configured to select a mode of a backup braking system based on the functional state of the primary braking system. For example, controller 121 of primary braking system may function as a controller to determine if primary braking system 120 is partially functional and determine a backup braking system mode. Controller 121 may be in communication with pressure source 122, primary pressure supply valves 124 and 126, and wheel inlet valves 113, 115, 117, 119 so that controller 121 may be able to determine the functional status of these components. For example, controller 121 may receive signals from pressure source 122, primary pressure supply valves 124 and 126, and/or wheel inlet valves 113, 115, 117, 119 indicating the functional status of each component. In another example, the absence of a signal from pressure source 122, primary pressure supply valves 124 and 126, and/or wheel inlet valves 113, 115, 117, 119 indicating the functional status of each component (e.g., that the component is non-functional). After determining the functional status of pressure source 122, primary pressure supply valves 124 and/or 126, and/or wheel inlet valves 113, 115, 117, 119, controller 121 may select a functional state of the backup braking system when primary braking system 120 is at least partially functional.

If the various components are all functional, controller 121 may control primary braking system 120 in a normal state, such as without the use of backup braking system 130 or parking brake system 160. Otherwise, if primary braking system 120 is fully non-functional, backup braking may be conducted in a mode in which fluid pressure from master cylinder 132 is supplied to the brake devices of all wheels 112, 114, 116, 118.

Figure 8:
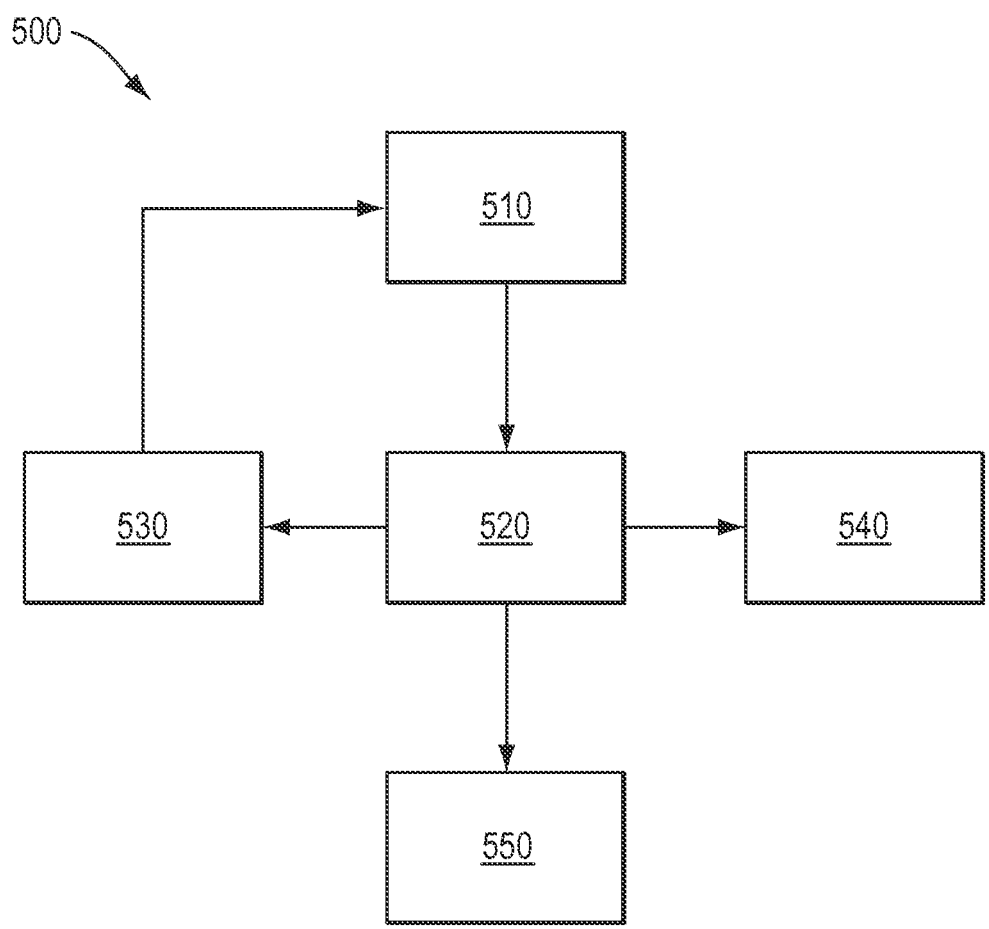
FIG. 8 is a flow chart depicting a method of braking, according to an exemplary embodiment.

Turning to FIG. 8, a braking method 500 is shown for an exemplary embodiment in which the functional state of a backup braking system is determined. In a first step 510, information may be received about the functional state of a primary braking system. For example, primary braking system controller 121 may monitor a functional status of the braking system of vehicle 100 in FIG. 2, including pressure source 122, primary pressure supply valves 124 and 126, and/or wheel inlet valves 113, 115, 117, 119. In step 520, the functional state of the primary braking system may be determined based on the information received in step 510, such as to determine whether primary braking system 120 is fully functional, partially functional, or fully non-functional.

If the primary braking system is fully functional, the method may proceed to step 530, in which the primary braking system is used according to normal operating conditions, such as without the assistance of backup braking system 130. The method may proceed from step 530 to step 510 to repeat the overall braking method 500 on a periodic basis. If it is determined in step 520 that the primary braking system is fully non-functional, the method 500 proceeds to step 540, in which backup braking occurs according to the exemplary embodiments described herein in which the primary braking system is fully non-functional. If it is determined in step 520 that the primary braking system is partially functional, the method 500 proceeds to step 550, in which backup braking occurs according to the exemplary embodiments described herein in which the primary braking system is partially functional.

As discussed above, when primary braking system 120 is partially functional, controller 121 may select a backup braking state in which mechanical-push through braking is provided to fewer than all wheels of vehicle 100. For example, controller 121 may direct mechanical push-through braking (e.g., by supplying hydraulic fluid from master cylinder 132 of backup braking system 130) to only two wheels of vehicle 100 (i.e., wheels of a single axle), such as front wheels 112 and 114, but not rear wheels 116 and 118. Thus, the braking power of the hydraulic fluid from master cylinder 132 is focused on front wheels 112 and 114 (i.e., wheels 112 and 114 of the front axle of vehicle 100). However, parking brake system 160 may also be used to brake rear wheels 116 and 118 and provide additional braking energy to backup braking system 130.

Figure 3:
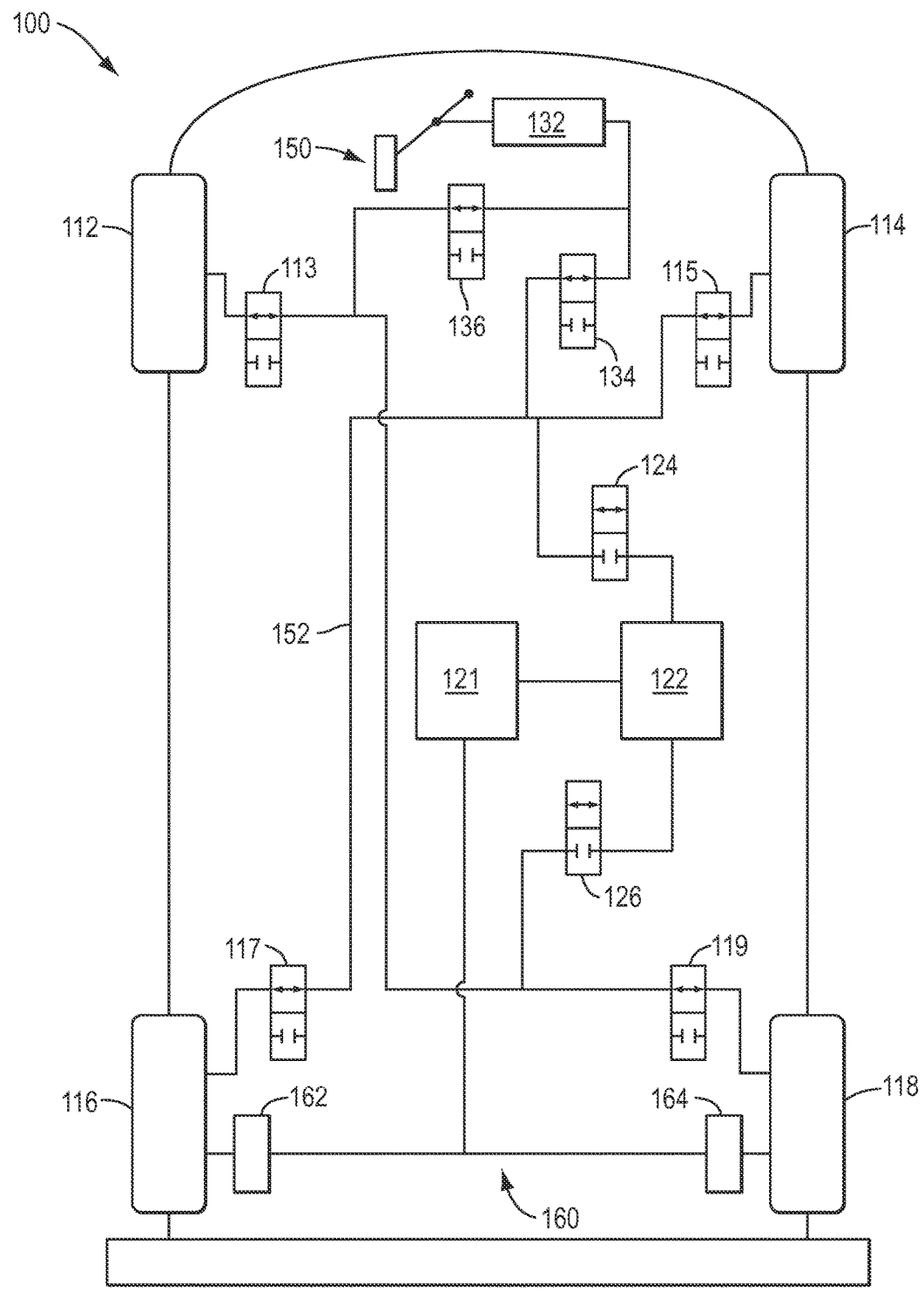
FIG. 3 is a schematic bottom view of a vehicle having a diagonal split brake line configuration when a primary braking system is non-functional, according to an exemplary embodiment.

According to an exemplary embodiment, a second backup braking state may be selected in which mechanical push-through braking is supplied to all wheels of a vehicle without the use of parking brake system 160. Turning to FIG. 3, the vehicle 100 of the exemplary embodiment of FIG. 2 is shown in a state in which primary braking system 120 is non-functional. Although primary braking system 120 is depicted as being non-functional in FIG. 3 due to primary pressure supply valves 124 and 126 being in a closed state, primary braking system 120 may be non-functional due to, for example, controller 121 being non-functional, and other states in which primary braking system 120 is non-functional. When primary braking system 120 is non-functional, such as when controller 121 itself fails, a predetermined backup braking mode may be utilized. The braking systems of the exemplary embodiments described herein may be configured, for example, so primary pressure supply valves (e.g., valves 124 and 126 in FIG. 2) may default to a closed state (such as when power or a control signal is now longer supplied via controller 121 in FIG. 2), master cylinder valves (e.g., valves 134 and 136 in FIG. 2) may default to an open state, and wheel inlet valves (e.g., valves 113, 115, 117, 119 in FIG. 2) may default to an open state to supply brake fluid pressure from a master cylinder to the brake devices of all wheels. If primary braking system 120 is non-functional but controller 121 remains functional, such as when both primary pressure supply valves 124 have failed, controller 121 may command master cylinder valves 134 and 136 to open and supply brake fluid pressure to all wheels 112, 114, 116, 118, according to an exemplary embodiment.

Thus, by determining the functional state of a primary braking system and selecting a backup braking operational state based on the functional state of the primary braking system, backup braking may be efficiently executed. Further, the amount of braking energy may be enhanced, such as by using the parking brake during backup braking.

Figure 4:
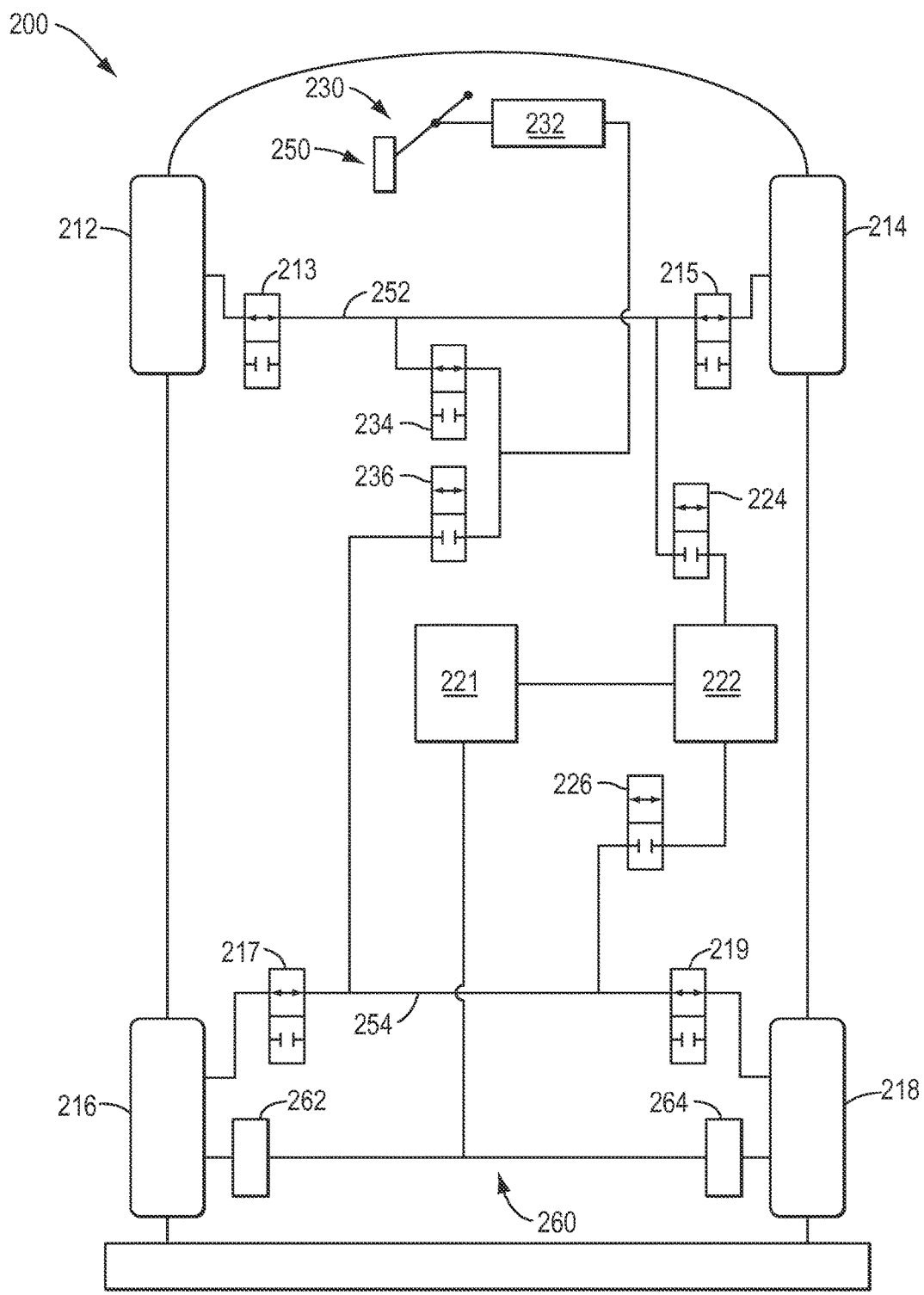
FIG. 4 is a schematic bottom view of a vehicle having a front-rear split brake line configuration when a primary braking system is partially functional, according to an exemplary embodiment.

As discussed above, a braking system for a vehicle is not limited to a diagonal split configuration, as depicted in the exemplary embodiments of FIGS. 2 and 3. Turning to FIG. 4, an exemplary embodiment of a vehicle 200 is shown that includes a braking system with a primary braking system 220 in communication with wheel inlet valves 213, 215, 217, 219 and braking devices (not shown) of wheels 212, 214, 216, 218. Primary braking system 220 may be, for example, a by-wire braking system. Primary braking system 220 may include a primary braking controller 221, a pressure source 222, and primary pressure supply valves 224 and 226, as discussed above in regard to the exemplary embodiment of FIGS. 2 and 3. In the configuration of FIG. 4, the braking system is arranged in a front-rear split, with brake line 252 communicating with wheel inlet valve 213 for left-front wheel 212 and wheel inlet valve 215 for right-front wheel 214, and brake line 254 communicating with wheel inlet valve 217 for left-rear wheel 216 and wheel inlet valve 219 for right-rear wheel 218. As shown in FIG. 4, primary pressure supply valve 224 is in communication with brake line 252 and primary pressure supply valve 226 is in communication with brake line 254.

Braking system of vehicle 200 further includes a backup braking system 230 including a master cylinder 230 connected to a brake pedal 250 and in communication with master cylinder valves 234 and 236 that are respectively in communication with brake lines 252 and 254. Vehicle 200 further includes a parking brake 260, which can be controlled by controller 221 and used to enhance braking power of backup braking system 230, as discussed above with regard to the exemplary embodiments of FIGS. 2 and 3.

In the state depicted in FIG. 4, primary braking system 220 is partially functional. Primary braking system 220 may be partially functional due to, for example, failure of pressure source 222 and/or failure of one of primary pressure supply valves 224 or 226. In the state shown in the exemplary embodiment of FIG. 4, controller 221 may select a backup braking mode in which hydraulic pressure from master cylinder 232 is directed to braking devices of front wheels 212 and 214 but not rear wheels 216 and 218. For example, controller 221 may close primary pressure supply valves 224 and 226 (if not in a default closed position already) and open master cylinder valve 234, but not master cylinder valve 236, to supply brake fluid pressure from master cylinder 232 to wheel inlet valves 213 and 215 for front wheels 212 and 214. Braking energy may be provided by parking brake system 260 to rear wheels 216 and 218, such as by controller 221 directing parking brake system 260 to apply braking energy to rear wheels 216 and 218 via park brake devices 262 and 264, similar to the exemplary embodiment of FIG. 2.

Figure 5:
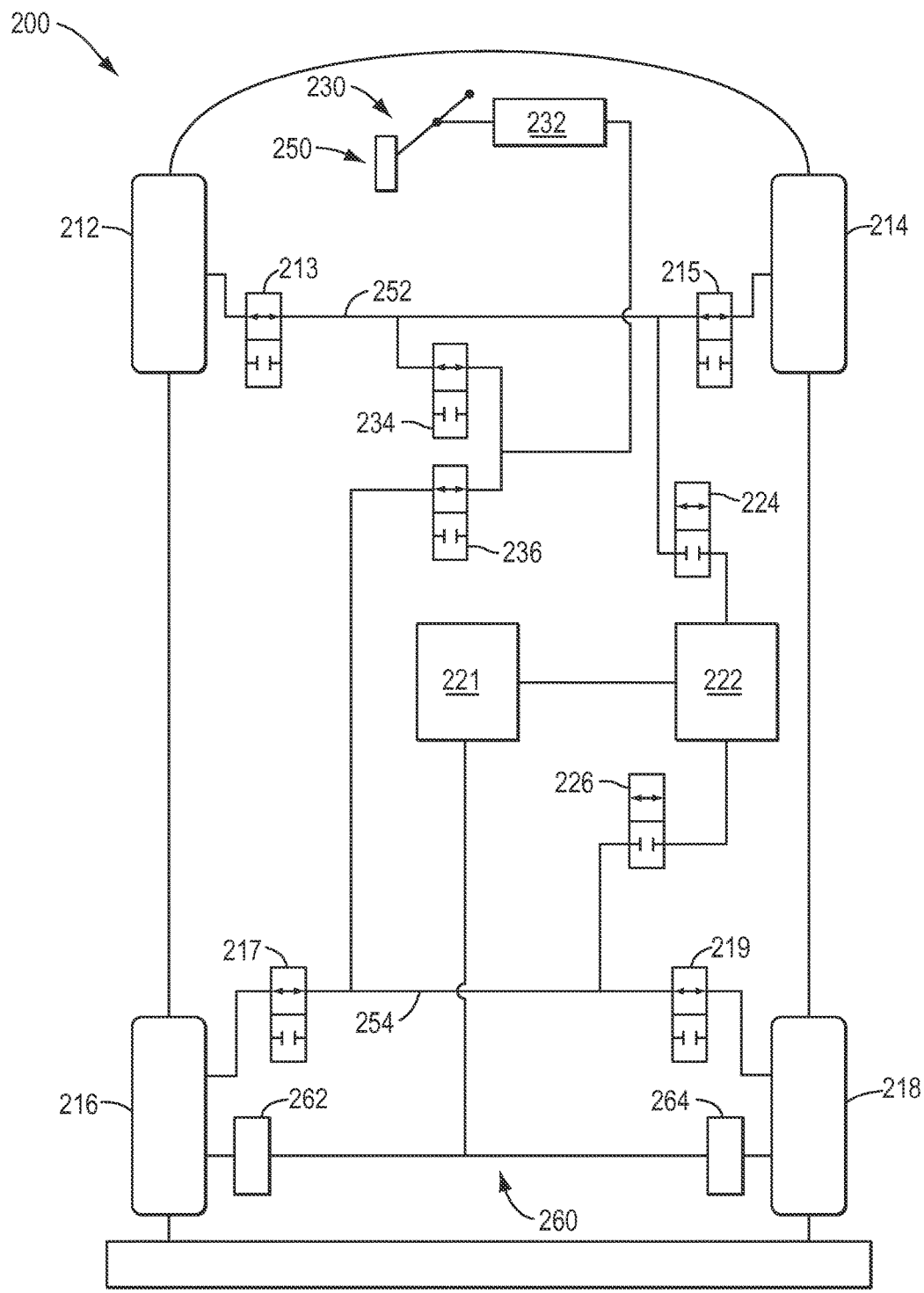
FIG. 5 is a schematic bottom view of a vehicle having a front-rear split brake line configuration when a primary braking system is non-functional, according to an exemplary embodiment.

Turning to FIG. 5, the vehicle 200 of FIG. 4 is shown in a state in which primary braking system 220 is non-functional. Primary braking system 220 may be non-functional due to, for example, controller 221 being non-functional, both of valves 224 and 226 being non-functional, or other states. In such a state, hydraulic fluid from master cylinder 232 may be provided to the braking devices of each of wheels 212, 214, 216, 218 by opening both master cylinder valves 234 and 236. Further, backup braking may be conducted without the use of parking brake system 260.

Figure 6:
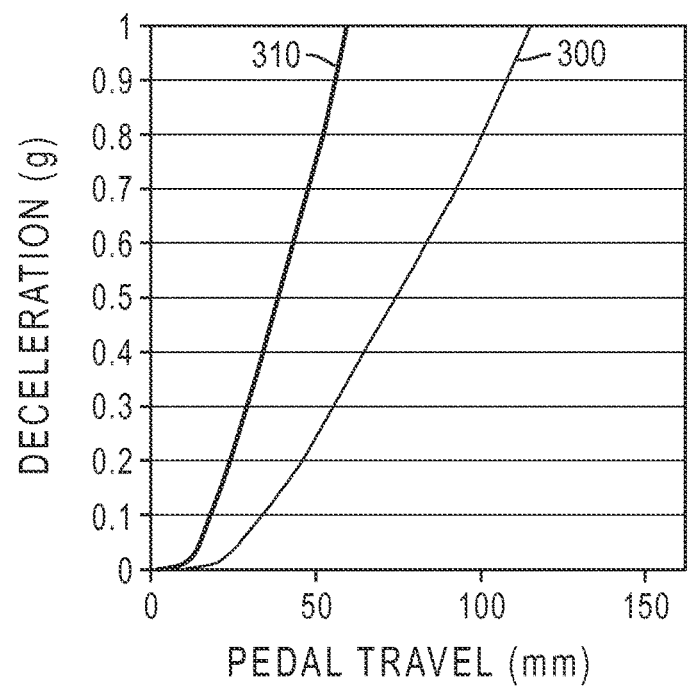
FIG. 6 is a graph depicting deceleration versus pedal travel for different backup braking systems.
Figure 7:
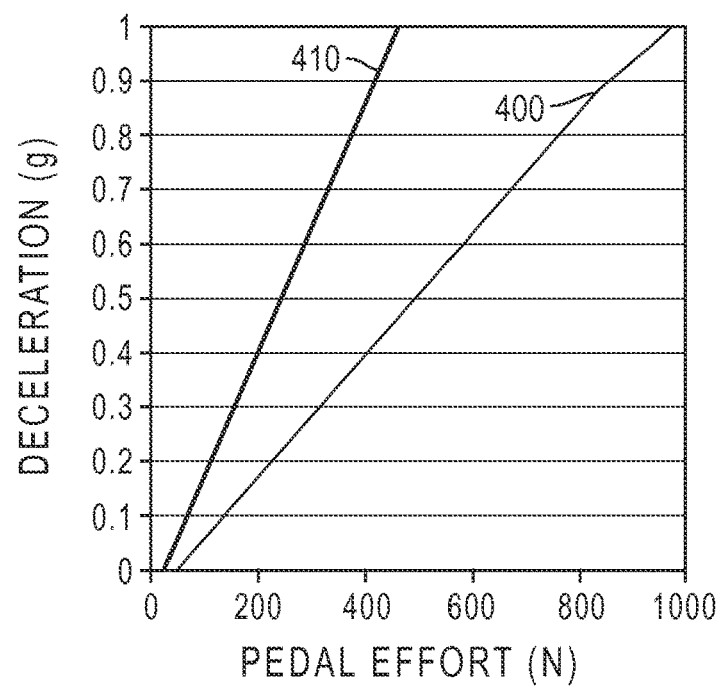
FIG. 7 is a graph depicting deceleration versus pedal effort for different backup braking systems.

Turning to FIG. 6, a graph is shown of deceleration versus pedal travel for a backup braking system 300 using only mechanical push-through braking to the wheels of a vehicle and a backup braking system 310 using mechanical push-through braking applied to the wheels of one axle and braking energy from a parking brake applied to another axle, such as in the exemplary embodiments of FIGS. 2 and 4. FIG. 7 depicts a graph of deceleration versus pedal effort for a backup braking system 400 using only mechanical push-through braking to the wheels of a vehicle and a backup braking system 410 using mechanical push-through braking applied to the wheels of one axle and braking energy from a parking brake applied to another axle, such as in the exemplary embodiments of FIGS. 2 and 4. As shown in FIGS. 6 and 7 and discussed above, providing additional braking energy to a backup braking system, such as from a parking brake of a vehicle, may provide more effective braking and provide a driver with a more confident feeling regarding braking, such as by requiring less pedal travel and effort. Further, by providing a backup braking system controller that selects, based on the functional state of a primary braking system, between a first mode in which hydraulic pressure of a backup braking system is applied to some wheels of a vehicle and a second mode in which the hydraulic pressure of the backup braking system is applied to all wheels, backup braking may be efficiently conducted while providing a drive with a more confident feeling of braking.

Although parking brake systems have been used in which parking brake devices are either actuated or not used, parking brake systems of the exemplary embodiments described herein, such as parking brake systems 160 and 260 of the exemplary embodiments of FIGS. 2-5, may utilize proportional braking. Thus, instead of using a single, predetermined braking force to slow and/or stop the wheels of a vehicle, the braking force is proportional to the amount of pedal depression made by a driver to a pedal. As a result, a driver may feel that the vehicle is braking in a manner corresponding to the amount of pedal depression, even when braking is achieved by a backup braking mode using the parking brake in a proportional manner.

According to an exemplary embodiment, when a parking brake system is an electric parking brake, the parking brake system may receive use signals from a brake pedal and/or master cylinder to determine the amount of pedal depression by a driver and use the signals to control the parking brake proportionally to the amount of pedal depression. In the exemplary embodiments of FIGS. 2 and 4, controller 121 and 221 may receive signals from pedal sensors and/or master cylinder sensors to determine the amount of pedal depression and then control parking brake devices 162, 164, 262, 264 in a proportional manner. For example, when parking brake devices 162, 164, 262, 264 are devices actuated by electric motors, such as screw devices to apply pressure to a brake caliper of a wheel, controller 121 and 221 may control the amount of current supplied to the electric motors actuating parking brake devices 162, 164, 262, 264 so the parking brake applies braking energy in a manner proportional to the amount of pedal depression.

According to an exemplary embodiment, a parking brake system may be controlled to utilize anti-lock braking. For example, when parking brake system 160 and 260 of the exemplary embodiments of FIGS. 2 and 4 are used in backup braking, controller 121, 221 may receive signals from wheel speed sensors, such as wheel speed sensors for rear wheels 116, 118, 216, 218, to indicate whether a wheel has locked. When a wheel speed signal indicates that a wheel has locked, controller 121, 221 may control parking brake devices 162, 164, 262, 264 to apply less force, such as by reducing a current supplied to motors actuating parking brake devices 162, 164, 262, 264, so that a wheel unlocks. According to an exemplary embodiment, a park brake system may be controlled to use anti-lock braking when also using proportional braking, as described above.

Further modifications and alternative embodiments will be apparent to those of ordinary skill in the art in view of the disclosure herein. For example, the systems and the methods may include additional components or steps that were omitted from the diagrams and description for clarity of operation. Accordingly, this description is to be construed as illustrative only and is for the purpose of teaching those skilled in the art the general manner of carrying out the present teachings. It is to be understood that the various embodiments shown and described herein are to be taken as exemplary. Elements and materials, and arrangements of those elements and materials, may be substituted for those illustrated and described herein, parts and processes may be reversed, and certain features of the present teachings may be utilized independently, all as would be apparent to one skilled in the art after having the benefit of the description herein. Changes may be made in the elements described herein without departing from the spirit and scope of the present teachings and following claims.

It is to be understood that the particular examples and embodiments set forth herein are non-limiting, and modifications to structure, dimensions, materials, and methodologies may be made without departing from the scope of the present teachings.

Other embodiments in accordance with the present disclosure will be apparent to those skilled in the art from consideration of the specification and practice of the invention disclosed herein. It is intended that the specification and examples be considered as exemplary only, with a true scope and spirit being indicated by the following claims.

This description and the accompanying drawings that illustrate exemplary embodiments of the present teachings should not be taken as limiting. Various mechanical, compositional, structural, electrical, and operational changes may be made without departing from the scope of this description and the claims, including equivalents. In some instances, well-known structures and techniques have not been shown or described in detail so as not to obscure the disclosure. Like numbers in two or more figures represent the same or similar elements. Furthermore, elements and their associated features that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

For the purposes of this specification and appended claims, unless otherwise indicated, all numbers expressing quantities, percentages, or proportions, and other numerical values used in the specification and claims, are to be understood as being modified in all instances by the term "about," to the extent they are not already so modified. Accordingly, unless indicated to the contrary, the numerical parameters set forth in the following specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," and any singular use of any word, include plural referents unless expressly and unequivocally limited to one referent. As used herein, the term "include" and its grammatical variants are intended to be non-limiting, such that recitation of items in a list is not to the exclusion of other like items that can be substituted or added to the listed items.

What is claimed is:

1. A brake system for a vehicle, comprising:
 a primary braking system configured to apply braking energy to wheels of the vehicle;
 a backup braking system comprising a master cylinder configured to supply braking energy to one or more of the wheels of the vehicle;
 a parking brake system; and
 a braking system controller configured to select a mode of backup braking based on a functional state of the primary braking system;
 wherein the master cylinder supplies the braking energy to wheels of a single axle of the vehicle and only the parking brake system applies braking energy to wheels of a single axle of the vehicle that differs from the single axle to which the master cylinder supplies braking energy in a first mode of backup braking;
 wherein the master cylinder supplies the braking energy to all of the wheels of the vehicle in a second mode of backup braking; and
 wherein brake lines configured to supply braking energy via the primary and backup braking systems have a diagonal split configuration.

2. The brake system of claim 1, wherein the parking brake system utilizes braking in proportion to an amount of brake pedal depression.

3. The brake system of claim 2, wherein the parking brake system utilizes anti-lock braking.

4. The brake system of claim 1, wherein the single axle the parking brake applies braking energy to is a rear axle of the vehicle and the single axle the master cylinder supplies braking energy to is a front axle of the vehicle.

5. The brake system of claim 1, wherein in the second mode, the primary braking system is non-functional.

6. The brake system of claim 5, wherein the master cylinder supplies the braking energy to all of the wheels of the vehicle in the second mode when the braking system controller is non-functional and valves supplying brake fluid pressure from the master cylinder default to an open state.

7. The brake system of claim 1, wherein in the first mode, the primary braking system is partially functional.

8. A vehicle, comprising:
 a plurality of wheels; and
 a brake system, comprising:
  a primary braking system configured to apply braking energy to the wheels;
  a backup braking system comprising a master cylinder configured to supply braking energy to one or more of the wheels;
  a parking brake system; and
  a braking system controller configured to select a mode of backup braking based on a functional state of the primary braking system;
  wherein the master cylinder supplies the braking energy to wheels of a single axle of the vehicle and only the parking brake system applies braking energy to wheels of a single axle of the vehicle that differs from the single axle to which the master cylinder supplies braking energy in a first mode of backup braking, and the master cylinder supplies the braking energy to all of the wheels in a second mode of backup braking; and
  wherein brake lines configured to supply braking energy via the primary and backup braking systems have a diagonal split configuration.

9. The vehicle of claim 8, wherein the parking brake system utilizes braking in proportion to an amount of brake pedal depression.

10. The vehicle of claim 9, wherein the parking brake system utilizes anti-lock braking.

11. The vehicle of claim 8, wherein the single axle the parking brake applies braking energy to is a rear axle of the vehicle and the single axle the master cylinder supplies braking energy to is a front axle of the vehicle.

12. The vehicle of claim 8, wherein the primary braking system is non-functional when the braking system controller is non-functional.

13. A method of braking a vehicle, the method comprising:
   determining an operational state of a primary braking system of the vehicle;
   selecting a first mode of backup braking when the primary braking system is non-functional or selecting a second mode of backup braking when the primary braking system is partially functional; and
   when the first mode of backup braking has been selected, commanding a backup braking system to supply braking energy to all wheels of the vehicle using a master cylinder; and
   when the second mode of backup braking has been selected, commanding the backup braking system to supply braking energy to wheels of a single axle of the vehicle using the master cylinder and commanding a parking brake system to apply braking energy to wheels of a single axle of the vehicle that differs from the single axle to which the master cylinder supplies braking energy in an amount proportional to an amount of brake pedal travel, wherein in the second mode of backup braking, only the parking brake system provides braking energy to the wheels of the single axle of the vehicle that differs from the single axle to which the master cylinder supplies braking energy.

* * * * *